G. H. PHILLIPS.

Reservoir Cooking Stove.

No. 4,219. Reissued Dec. 27, 1870.

Witnesses.

D. S. Barney

A. S. Rile

Inventor.

Geo. H. Phillips

By Richard H. Rille his Attorney.

N. PETERS, Photo-Lithographer, Washington, D. C.

United States Patent Office.

GEORGE H. PHILLIPS, OF TROY, NEW YORK.

Letters Patent No. 86,585, dated February 2, 1869; reissue No. 4,219, dated December 27, 1870.

IMPROVEMENT IN RESERVOIR COOKING-STOVES.

The Schedule referred to in these Letters Patent and making part of the same.

I, GEORGE H. PHILLIPS, of the city of Troy, county of Rensselaer and State of New York, have invented a new and useful Improvement in Reservoir Cooking-Stoves, of which the following is a specification.

The nature of my invention consists in constructing a water-reservoir at the back of a cooking-stove (and below the horizontal line of the top plate of the stove) with a recessed bottom, raised within, and formed so that when closed below, it will become a horizontal flue or passage of escape for the products of combustion on their way to the exit-pipe, and thereby heating the reservoir and its contents.

It also consists in the construction of an opening in and through the back plate of the stove opposite the flue formed by the recessed bottom before mentioned, and in combination therewith, so that the products of combustion will pass directly from the stove into the flue of the reservoir, and through the same to the vertical flue, and then upward to the exit-pipe.

It also consists in constructing a reservoir at the back of a cooking-stove, and in such combination therewith that the products of combustion, in their escape to the exit-pipe, must pass through the interior of the reservoir, the reservoir being located below the horizontal line of the top plate of the stove, and having a flue constructed within as a passage for the products of combustion, and there being no other outlet, so that, whether a direct draught or a reversed draught is used, the water in the reservoir may be properly heated thereby.

It also consists of a plate, or its equivalent, forming the bottom of the flue formed by the recessed bottom of the reservoir, and secured properly to the bottom of the reservoir, and also securely fastened to the back plate of the stove.

It also consists in the admitting the products of combustion directly from the stove proper into a water-reservoir, situated, located, and arranged on the back of a cooking-stove, and below the top plate of the stove, so that the water in the reservoir will be heated by the products of combustion on their way to the exit-pipe.

The object of the several parts of my invention is as follows, viz:

By recessing the bottom of the reservoir I keep the heat within the same, so that but little can escape elsewhere. As all but the bottom plate of the flue thus formed is within the reservoir, and as the water can circulate and lie nearly all around the said flue, I gain in heating surface; then, by thus recessing the flue, and constructing it within and above the bottom horizontal line of the reservoir, I gain more room and space within a warming-closet when placed, as usual, below the reservoir; and in thus recessing the bottom I shorten the extent of the direct draught from the stove, as it enables me to have the opening from the flues of the stove placed higher up and nearer the top of the oven, and thereby increasing the force of the direct draught. And in the construction of a reservoir with a vertical flue within its walls, and taking the products of combustion out from the flues of the stove and into the flue of the reservoir, I obtain an easy and perfect mode of heating the same, either by a direct or a reversed draught, and while the heating is simplified and under better control than heretofore; and I also economize in material, and render easier the process of molding.

*Description of the Accompanying Drawing.*

Like letters of reference indicate like parts in the several figures.

*General Description.*

Figure 1:
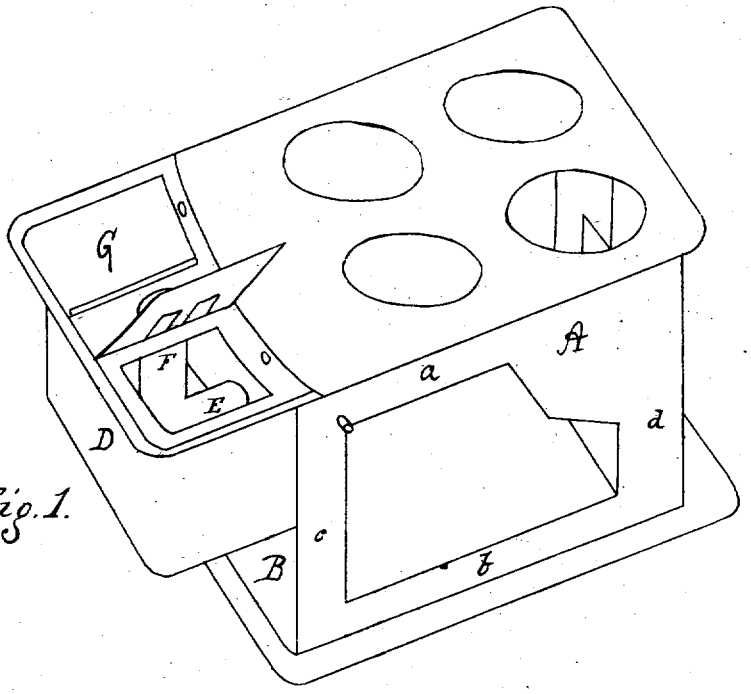
Figure 1 is a perspective view of my improved cooking-stove.
Figure 2:
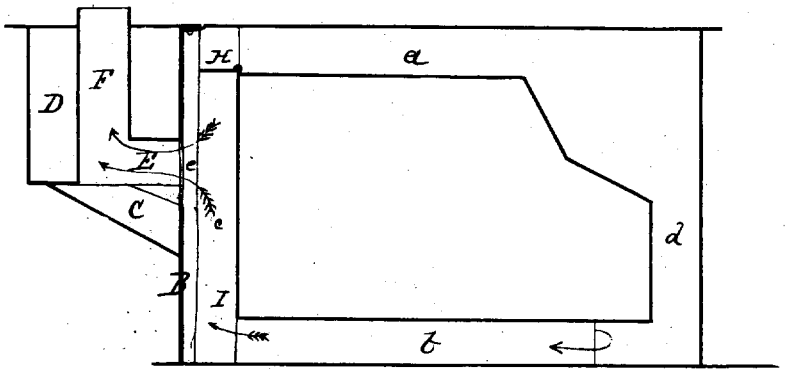
Figure 2 is a longitudinal central vertical section of the same.
Figure 3:
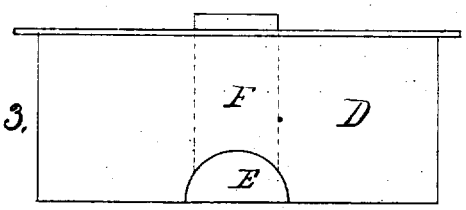
Figure 3 is a detached elevation of the water-reservoir removed from the stove, showing the wall which joins the stove and the end of the recessed flue, dotted lines to represent the vertical flue.
Figure 4:
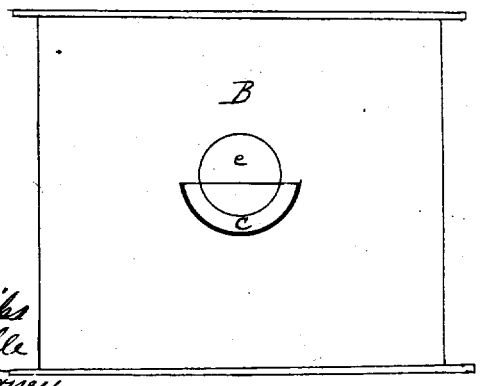
Figure 4 is a rear elevation of the stove, the water-reservoir being detached.

A in the drawing represents a cooking-stove of the usual form, and having a flue-space over the oven at *a*, rear vertical flue or flues at *c*, and bottom flue or flues at *b*, and a front flue or ash-pit, as usual, at *d*. And my invention is applicable to any of the ordinary modes of construction adopted in stove manufacture, the only alteration required in the main body of the stove being the closing of the exit-pipe collar, usually located directly over the rear ascending-flue, and in causing an equivalent opening to be made in the rear vertical plate of the stove at *e*.

When casting the top plate of my stove I omit the usual pipe-collar and exit-opening, and when casting the back vertical plate I provide a circular opening, *e*.

Bolted to or otherwise secured to the rear end of the top plate of the stove is the reservoir D, its front end made to conform to the back vertical plate of the stove, and fitting closely thereto. The bottom of the reservoir is recessed or formed by casting or otherwise a horizontal flue, E. This recess is so constructed that, when closed by a plate at the bottom, it forms a flue.

At F is shown a vertical pipe, also forming a flue, and joining the horizontal flue E, forms an elbow therewith. This flue is also cast or formed as an integral part of said reservoir; and may be located centrally in the interior of the same, or forward or backward, as deemed best by the manufacturer.

The reservoir is provided with lids G, and is intended for containing water to be heated.

H is a damper between the partitions I or flue-strips, dividing the center flue when three flues are used. The said damper, when in a horizontal position, allows a direct draught to be used, in connection with a down or lower draught, through flue *b*, both passing through the reservoir, and thus keeping up an even heat at all times. When, however, the damper H is in a vertical position, the direct draught is shut off, and only the lower or reversed draught passes through the reservoir.

At C is shown the plate formed to cover the horizontal flue of the reservoir, marked E, and is either cast with the rear vertical plate of the stove, or properly secured thereto, as deemed best; and it is also securely fastened to the bottom of the reservoir, so that a perfect flue is formed, as before mentioned, by the recess or indentation of the reservoir bottom and the plate C, as shown on the drawing.

The advantages of the construction herein described of my improved reservoir cooking-stove are, that the products of combustion, after doing duty in the body of the stove in boiling, baking, and the various processes of cooking, then pass entirely through the reservoir, imparting heat thereto, and heating the water therein with either a direct draught or a reversed draught, without in any way retarding or interfering with the baking processes in the oven.

One difficulty found in stoves with reservoirs as usually and heretofore constructed is, that while baking in the oven, should fresh or cold water be placed in the reservoir, the oven becomes cooled, and the operation of baking retarded, and, with some articles, resulting in their injury as palatable articles of food. All this difficulty I overcome by my mode of construction. I also obtain a great heating surface within the reservoir, so that all the heat is saved, and a more even and uniform heat obtained, and I gain sufficient room below the reservoir for a warming-closet if desired, as the flue of the reservoir encroaches but slightly, if at all, on such space.

I am aware that a flue has been carried along under the bottom and up the back of a reservoir, and a flue has been carried all around a reservoir similarly located, the flues being entirely outside the same, and the reservoir bottom being level, and without a recess or indentation; and I am also aware that a pipe has been carried vertically through a reservoir located wholly above the top plate of the stove. These modes of construction and arrangement I do not claim. The latter does not heat well enough, and the former are too expensive and difficult, especially in casting.

Thus it will be seen that my mode of construction is more economical, readily molded, and more efficient in operation.

Having thus described my invention,

What I claim, and desire to secure by Letters Patent, is—

1. A water-reservoir, constructed in such manner that it has a vertical flue through it, and, by the addition of one plate, a horizontal flue also running through the same, and uniting or combining the said reservoir with a cooking-stove, against the back of the stove, its upper surface flush with the stove-top, the said flue or flues of the reservoir being the only outlet of escape for the products of combustion from the stove to the exit-pipe, substantially in manner as described and set forth.

2. In combination with the reservoir so constructed, the plate C, forming the bottom of the horizontal flue E, substantially in manner as described and set forth.

GEO. H. PHILLIPS.

Witnesses:

JOHN A. GRISWOLD,

RICHARD H. REILLE.